United States Patent [19]

Taylor

[11] 3,764,810
[45] Oct. 9, 1973

[54] SENSITIVITY SCINTILLATION CRYSTAL AND METHOD THEREFOR
[75] Inventor: Abraham Taylor, Pittsburgh, Pa.
[73] Assignee: Westinghouse Electric Corporation, Pittsburgh, Pa.
[22] Filed: Dec. 22, 1970
[21] Appl. No.: 100,681

[52] U.S. Cl............................ 250/473, 250/484
[51] Int. Cl. ............................................ G01t 1/20
[58] Field of Search............ 250/71.5 R, 80, 83.3 R; 252/301.1

[56] References Cited
UNITED STATES PATENTS
2,439,181  4/1948  Nicoll .................................. 250/80
2,879,400  3/1959  Schneeberger................. 250/83.3 R OTHER PUBLICATIONS
F. A. Kroger, Luminescence in Solids, May 1949, p. 280.

Primary Examiner—Archie R. Borchelt
Attorney—F. H. Henson, C. F. Renz and A. S. Oddi

[57] ABSTRACT

A method of increasing the sensitivity of a scintillation crystal and improved sensitivity crystal to uranium K radiation wherein thorium, for example, is added to the scintillation crystal to increase the scintillation yield thereof by producing thorium characteristic radiation and increasing production of photoelectrons in response to the absorption of a portion of the uranium K radiation applied thereto.

4 Claims, 2 Drawing Figures

PATENTED OCT 9 1973 3,764,810

WITNESSES
Theodore F. Wrobel
James F. Young

INVENTOR
Abraham Taylor
BY
ATTORNEY

SENSITIVITY SCINTILLATION CRYSTAL AND METHOD THEREFOR

BACKGROUND OF THE INVENTION

1. Field of the Invention

The present invention relates to scintillation counters and, more particularly, to increasing the sensitivity of such counters to uranium K radiation.

2. Description of the Prior Art

Two techniques of fluorescent analysis are commonly employed, namely, non-dispersive and dispersive. In non-dispersive analysis fluorescent radiation from a sample is detected and measured directly by means of a detector which directly counts the number of X-ray quanta from the sample. In dispersive analysis the fluorescent radiation is directed via a suitable collimator system upon an analyzing crystal from which it is "Bragg reflected." The reflected radiation is then detected and measured through a suitable counting device. The fluorescent radiation in both dispersive and non-dispersive analysis must be converted into electrical signals in the detector and then amplified sufficiently to operate the counter mechanism. When analyzing relatively short wavelengths the detectors usually take the form of well known Geiger counters, proportional counters, luminescent phosphors and scintillation-counter crystals. Because of their short time-delay and the fact that they can be employed with pulse-height discrimination circuits which enable the detection and recording to be confined to a select, narrow wavelength band, scintillation counter crystals are preferred. In a typical detection configuration, the scintillation crystal is mounted near the photocathode end of an electron multiplier tube, which, in response to the scintillation, provides amplified electrical output pulses. Scintillation counters of the well known thallium-doped sodium iodide type are approximately 100% sensitive in wavelength regions of about 0.3-0.4 Angstrom units as compared to the only 5-15 percent sensitivity of proportional counters filled with argon, krypton or xenon. However, as the wavelength is decreased, the efficiency of these counters also decreases so that in the wavelength region of uranium K ($\alpha + \beta$) radiation the efficiency of a thallium-doped sodium iodide crystal has fallen to approximately 30 percent.

The mechanism by which the detecting crystal produces scintillation is by the X-radiation being absorbed and scattered with the concomitant production of photo-electrons and ion pairs. It has been suggested in U.S. Pat. No. 2,719,127 that a scintillator crystal having increased sensitivity to neutron radiation can be provided by adding europium to the scintillation crystal. Also the absorption of X-rays can be increased by the use of alkali alloys such as cesium iodide as taught in U.S. Pat. No. 2,651,584 and by the addition of gold or other materials having atomic number higher than 51 such as taught in U.S. Pat. No. 2,879,400. However the problem remains of increasing the sensitivity of a scintillation crystal to the uranium K radiation in the wavelength region where the efficiency of such crystals is normally relatively low. Providing an increased sensitivity scintillation crystal to uranium K radiation can be highly important in analyzing uranium ores and will become more important as lower and lower grade ores must be analyzed in prospecting for new supplies of uranium.

SUMMARY OF THE INVENTION

Broadly, the present invention teaches a method for improving the sensitivity of scintillation crystals and, more particularly, a scintillation device with improved sensitivity to uranium K radiation wherein a material is added to the scintillation crystal for increasing its scintillation yield.

DESCRIPTION OF THE PREFERRED EMBODIMENTS

Figure 1:
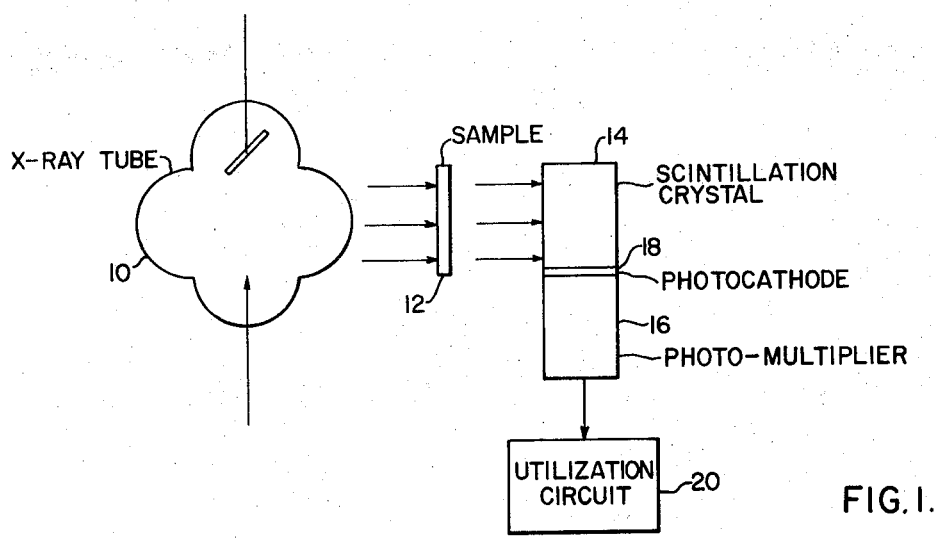
FIG. 1 is a schematic diagram used in explaining the method of the present invention and the device thereof.

FIG. 1 shows an arrangement for non-dispersive analysis; however, it should be understood that dispersive analysis could be employed if desired. An X-ray tube 10 is provided which emits X-radiation for irradiating a sample 12. The sample 12 includes uranium and the sample may, for example, comprise a low uranium content ore. In response to the X-radiation applied to the sample 12, characteristic uranium K ($\alpha+\beta$) radiation is emitted from the sample 12. The characteristic uranium K radiation is at a wavelength of 0.109 A and is applied to a scintillation crystal 14.

In response to the uranium K radiation being applied to the scintillation crystal 14 the crystal will scintillate emitting fluorescent light. A photo-multiplier 16 having its photo-cathode 18 disposed contiguous to the scintillation crystal 14 is receptive to the light output of the scintillation crystal 14. The photo-multipliers 16 may comprise a well known photo-multiplier tube. In response to the light input thereto at the photo-cathode 18 from the scintillation crystal 14, the light will cause the release of electrons whose number will be multiplied in the tube and appear as amplified electrical signals at the output thereof. The electrical signals will be in the form of electrical pulses having a pulse repetition rate corresponding to the wavelength of the sample material under consideration, which in the present example is uranium. The pulse output from the photo-multiplier 16 is applied to a utilization circuit 20 which may comprise circuitry well known in the art, such as pulse-height discrimination circuits, and counting and recording circuits which are responsive to the narrow bandwidth of the pulse signals under consideration for uranium.

The problem which the present invention solves is to increase the sensitivity of the scintillation crystal 14 to uranium K radiation. As previously mentioned, the efficiency of commonly known scintillation crystals such as thallium-doped sodium iodide is approximately 30 percent at the characteristic wavelength of the uranium K radiation. To increase the scintillation yield of the crystal 14, in accordance with the present invention a material is added to the scintillation crystal which will increase the scintillation yield in the scintillation crystal. The added material is selected which has a K absorption edge at approximately the wavelength of the uranium K radiation which is at 0.107 Angstrom units. The element thorium having a K absorption edge at 0.113 Angstrom units is an ideal material since it would produce a substantially optimum fluorescent yield from a scintillation crystal which is intended to be responsive to uranium K radiation.

Therefore an example of the fabrication of a scintillation crystal 14 according to the teachings of the present invention would be to use an alkali-halide crystal, such as, for example, thallium-doped sodium iodide, thallium-doped lithium iodide or thallium-doped cesium iodide. Also tungsten phosphors of the calcium tungstate or calcium tungstate type, zinc sulphide or inorganic or organic phosphors could be employed. The addition of thorium to the scintillation crystal could be done by any well known techniques such as doping. For example, a soluble salt of thorium may be mixed with solution of sodium iodide doped with thallium. A crystal is then drawn so that a composite crystal of thorium-doped and thallium-doped sodium iodide crystal structure is provided. Other techniques for the dispersion of thorium through a scintillation crystal may be of course employed, such as, the physical disposition of particles of thorium or the disposition of strips or tubes of thorium within the crystal.

Hence the scintillation crystal with thorium added thereto will be highly sensitive to uranium fluorescent radiation from the sample. Radiation impinging directly upon portions of crystal not including thorium will cause direct scintillation of the crystal. Uranium radiation impinging upon the thorium will be heavily absorbed because of the proximity of the thorium absorption edge. This will cause the thorium to fluoresce thereby yielding a large quantity of thorium characteristic K ($\alpha + \beta$) radiation and causing photo-electrons to be released in the absorption process. Accordingly, in response to the thorium characteristic radiation and the production of photo-ions the crystal will be excited into strong scintillation. Thus the cumulative effect of both the thorium characteristic radiation and the photo-electrons produced will add to the direct scintillation yield thereby increasing the overall sensitivity and efficiency of the scintillation analyzation system to uranium K radiation.

Figure 2:
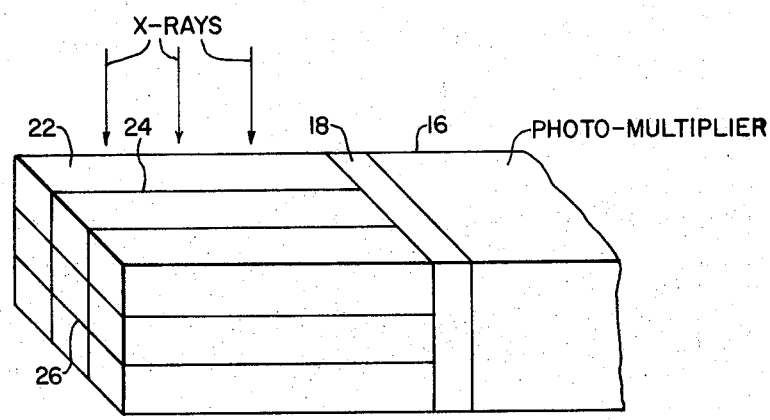
FIG. 2 is a pictorial diagram of another type of device which may be employed in the present invention.

Another non-limiting example of the fabrication of a scintillation crystal with thorium added thereto is shown in FIG. 2. In this construction doped alkali halide crystal, such as, thallium doped sodium iodide is sliced into the form of transparent parallel rods of rectangular or square cross-section 22. These sections are pressed together with thin layers of thorium metal or suitable thorium compound 24 disposed in the vertical plane and thin layers 26 in the horizontal plane 28. These layers 24 and 26 act as separators on adjacent surfaces of the parallel rods 22. The photo-multiplier 16 is disposed at right angles to the direction of the X-rays and parallel to the rods 22 so that the X-rays do not directly impinge upon the photo-cathode 18 of the photo-multiplier 16 and a light transparent path is provided through the parallel rods 22 along their axes to the photo-cathode 18. Thus the thin layers 24 and 26 of thorium metal which may have a thickness of only a few micrometers do not interfere with the transmission of light produced in response to scintillation to the photo-multiplier 16.

With a crystal structure constructed according to FIG. 2, uranium fluorescent radiation which strikes the parallel rods 22 will cause scintillation of the alkali-halide crystal directly. Uranium radiation impinging the thorium layers 24 and 26 will be heavily absorbed and will cause the thorium to fluoresce yielding large quantities of thorium characteristic radiation and will produce photoelectrons released further to excite scintillations in the crystal. Thus the thorium characteristic radiation and the photo-electrons will increase the overall efficiency of the crystal structure by adding to the scintillation yield. This will be sensed by the photo-multiplier cathode 18 and amplified in the photo-multiplier 16 to be supplied to the utilization circuit 20 as shown in FIG. 1.

1. A method of increasing the sensitivity of a alkali-halide doped scintillation crystal to uranium K radiation comprising
adding thorium by doping said crystal to increase the scintillation yield by producing radiation characteristic of the thorium added and increasing the production of photo-electrons in response to absorbing a portion of said uranium K radiation; and
irradiating said scintillation crystal with said uranium K radiation.

2. A method of increasing the sensitivity of a alkali-halide doped scintillation crystal to uranium K radiation comprising
adding thorium by disposition of strips thereof within said crystal to increase the scintillation yield by producing radiation characteristic of the thorium added and increasing the production of photoelectrons in response to absorbing a portion of said uranium K radiation; and
irradiating said scintillation crystal with said uranium K radiation.

3. A scintillation device for sensing uranium K radiation comprising:
a scintillation crystal comprised of a doped alkali-halide, thorium added to said crystal to increase the scintillation yield of said crystal by producing radiation characteristic of thorium and increasing the production of photoelectrons in response to absorbing a portion of said uranium K radiation.

4. The device of claim 3 wherein:
said crystal is doped with said thorium.

* * * * *